US009788062B2

United States Patent
Dimov et al.

(10) Patent No.: US 9,788,062 B2
(45) Date of Patent: Oct. 10, 2017

(54) SYSTEMS AND PROCESSES FOR DELIVERING DIGITAL VIDEO CONTENT BASED UPON EXCITEMENT DATA

(71) Applicant: SLING MEDIA INC., Foster City, CA (US)

(72) Inventors: Dmitry Dimov, San Francisco, CA (US); Yash Suresh Shah, San Mateo, CA (US); Andrey L. Abramov, Foster City, CA (US); Ilya Asnis, San Jose, CA (US); Davide Girlando, San Francisco, CA (US)

(73) Assignee: Sling Media Inc., Foster City, CA (US)

( * ) Notice: Subject to any disclaimer, the term of this patent is extended or adjusted under 35 U.S.C. 154(b) by 0 days.

(21) Appl. No.: 14/839,769

(22) Filed: Aug. 28, 2015

(65) Prior Publication Data

US 2016/0066042 A1    Mar. 3, 2016

Related U.S. Application Data

(60) Provisional application No. 62/044,178, filed on Aug. 29, 2014.

(51) Int. Cl.
*H04N 21/466* (2011.01)
*H04N 21/2668* (2011.01)
*H04N 21/4147* (2011.01)
*H04N 21/433* (2011.01)
*H04N 21/4335* (2011.01)
(Continued)

(52) U.S. Cl.
CPC ..... *H04N 21/4668* (2013.01); *H04N 21/2668* (2013.01); *H04N 21/4147* (2013.01); *H04N 21/4334* (2013.01); *H04N 21/4335* (2013.01);
*H04N 21/44008* (2013.01); *H04N 21/458* (2013.01); *H04N 21/4532* (2013.01); *H04N 21/4661* (2013.01); *H04N 21/4667* (2013.01); *H04N 21/4826* (2013.01);
(Continued)

(58) Field of Classification Search
CPC .......... H04N 21/4668; H04N 21/2668; H04N 21/4147; H04N 21/4334; H04N 21/4335; H04N 21/44008; H04N 21/4532; H04N 21/458; H04N 21/4661; H04N 21/4667; H04N 21/4826; H04N 21/8133; H04N 21/84; H04N 21/8456
See application file for complete search history.

(56) References Cited

U.S. PATENT DOCUMENTS 7,543,322 B1 * 6/2009 Bhogal .............. H04N 5/44543
725/38
7,646,962 B1 * 1/2010 Ellis ................. H04N 21/23439
386/248

(Continued)

OTHER PUBLICATIONS

The International Bureau of WIPO, International Preliminary Report on Patentability in International Application No. PCT/US2015/047570 mailed Mar. 9, 2017.

*Primary Examiner* — Randy Flynn
(74) *Attorney, Agent, or Firm* — LK Global

(57) ABSTRACT

Processes, systems and devices are described to enhance the television or other media viewing experience based upon excitement data that is associated with the program. Excitement data can be used to identify the most exciting portions of media programs, therefore allowing for improved identification of programs or portions of programs for viewing, streaming, recording or other purposes.

17 Claims, 3 Drawing Sheets

Figure 1:
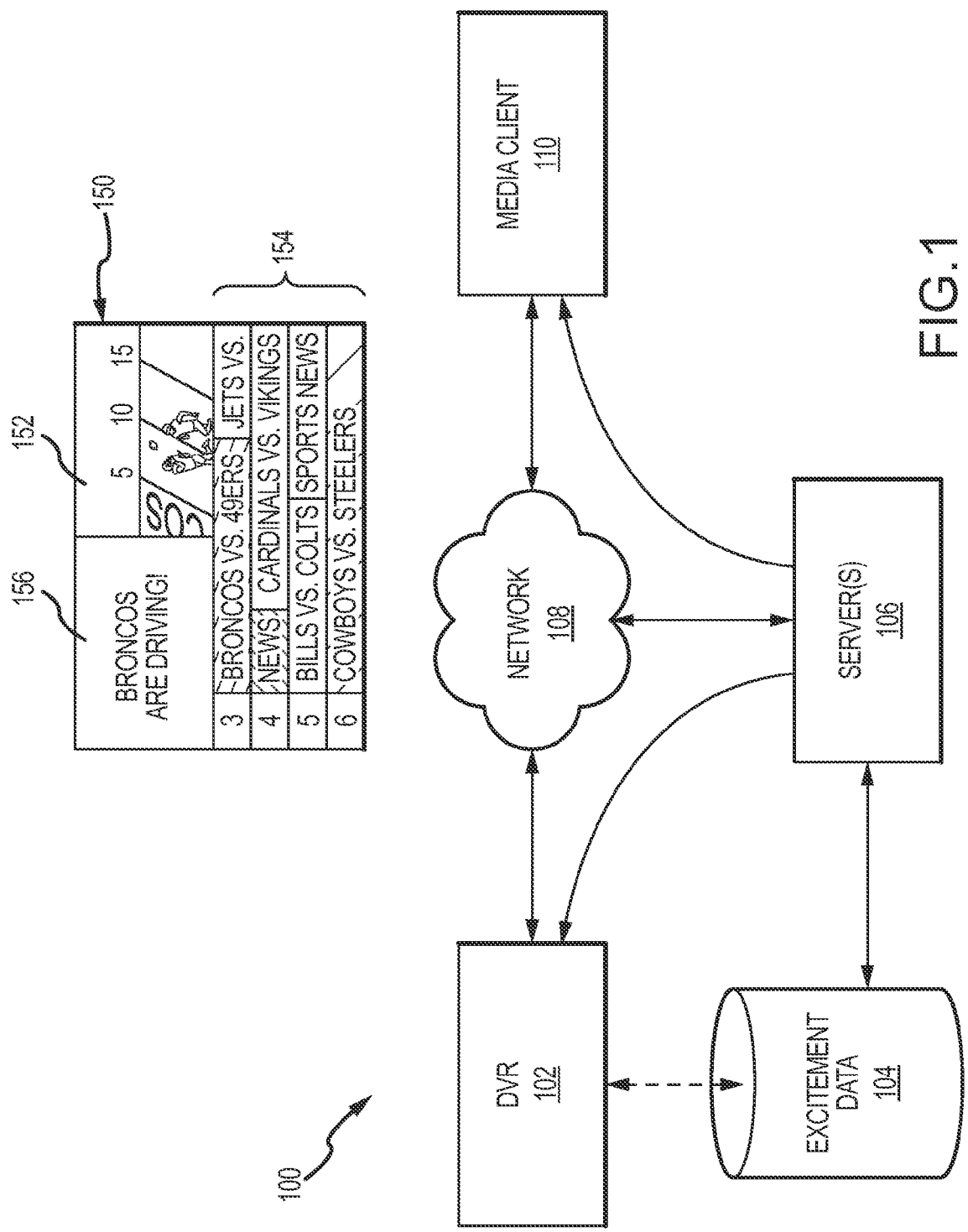

(51) Int. Cl.
*H04N 21/44* (2011.01)
*H04N 21/45* (2011.01)
*H04N 21/458* (2011.01)
*H04N 21/482* (2011.01)
*H04N 21/81* (2011.01)
*H04N 21/84* (2011.01)
*H04N 21/845* (2011.01)

(52) U.S. Cl.
CPC ......... *H04N 21/8133* (2013.01); *H04N 21/84* (2013.01); *H04N 21/8456* (2013.01)

(56) References Cited

U.S. PATENT DOCUMENTS

| | | | |
|---|---|---|---|
| 8,196,168 B1 * | 6/2012 | Bryan | G11B 27/002 725/134 |
| 8,535,131 B2 | 9/2013 | Packard et al. | |
| 8,595,763 B1 * | 11/2013 | Packard | H04N 7/025 725/108 |
| 9,060,210 B2 | 6/2015 | Packard et al. | |
| 2004/0003403 A1 | 1/2004 | Marsh | |
| 2005/0120368 A1 * | 6/2005 | Goronzy | G06F 17/30787 725/28 |
| 2005/0204294 A1 * | 9/2005 | Burke | H04N 21/4312 715/739 |
| 2008/0115166 A1 * | 5/2008 | Bhogal | H04N 5/44543 725/46 |
| 2008/0168503 A1 * | 7/2008 | Sparrell | H04N 5/44513 725/58 |
| 2009/0144777 A1 * | 6/2009 | Mikami | H04N 5/44543 725/50 |
| 2009/0235313 A1 * | 9/2009 | Maruyama | H04N 21/42201 725/46 |
| 2010/0086277 A1 * | 4/2010 | Craner | H04N 5/76 386/278 |
| 2012/0216118 A1 | 8/2012 | Lin et al. | |
| 2012/0324491 A1 * | 12/2012 | Bathiche | H04H 60/33 725/10 |
| 2013/0268620 A1 * | 10/2013 | Osminer | H04N 21/251 709/217 |
| 2013/0326575 A1 | 12/2013 | Robillard et al. | |
| 2013/0332965 A1 * | 12/2013 | Seyller | H04N 21/252 725/61 |
| 2014/0028917 A1 | 1/2014 | Smith et al. | |
| 2014/0067825 A1 * | 3/2014 | Oztaskent | H04N 21/4782 707/748 |
| 2014/0321831 A1 * | 10/2014 | Olsen | H04N 21/252 386/241 |
| 2015/0281778 A1 * | 10/2015 | Xhafa | H04N 21/4583 386/292 |

* cited by examiner

SYSTEMS AND PROCESSES FOR DELIVERING DIGITAL VIDEO CONTENT BASED UPON EXCITEMENT DATA

PRIORITY CLAIM

This application claims priority to U.S. Provisional Application Ser. No. 62/044,178 which was filed on Aug. 29, 2014 and which is incorporated herein by reference.

TECHNICAL FIELD

The following discussion generally relates to the delivery of digital video content, and more particularly to the delivery of digital video content based upon excitement data.

BACKGROUND

Media streaming is becoming an increasingly popular way of delivering television, movies and other media content to viewers. Media streams are typically point-to-point or broadcast transmissions of digitized content that can be sent over the Internet or a similar network. Media streaming is often used to facilitate video on demand (VOD) services, local storage and/or remote storage digital video recorder (LSDVR and/or RSDVR) services, Internet Protocol television (IPTV) services, placeshifted media viewing and/or any number of other convenient services. In many cases, the media stream is played back for the viewer in real time as the stream continues to be delivered to the player. In other embodiments, the video is sideloaded or cached at the player to permit faster than real time delivery of the video stream.

In certain instances, a viewer may be interested in a certain program or program type or genre (e.g., a sports game, such as a football game). The viewer may not, however, be interested in watching each program of interest in its entirety, nor, in many instances, may the viewer be in a position to view a program or programs of interest. Due to the volume of sports games or other content of interest, many viewers may prefer to view the highlights of multiple programs, or to otherwise identify and view the most interesting content that is available.

At present, it can be a substantial challenge to identify the most interesting content that is available. If multiple sports broadcasts are occurring simultaneously, for example, it can be relatively difficult to know which broadcast is most interesting at any given time without continually switching between the different broadcasts. Similar issues can arise while viewing movies, reality programs, television dramas, action shows or any other programs of interest to any number of different viewers.

BRIEF DESCRIPTION

The following discussion relates to various example implementations of systems, devices and processes that record program highlights or exciting portions of one or more media programs. The concepts described herein may be used in digital video recorders, remote storage video recorders, video on demand services, set top boxes or other television receivers, placeshifting systems, and/or any other applications as desired.

Some implementations provide digital video recorder ("DVR") or similar storage system to manage storage of video content. A DVR system suitably comprises an interface configured to receive the video content, a disk drive configured to store the video content on a spinning disk having an inner portion and an outer portion, and a processor. The processor is configured to control the reception of the video content via the interface and to direct the storage of the received video content on the disk drive. In various implementations, data retrieved from a database of "excitement data" or the like can be used to identify the most exciting programs currently being broadcast, or the most exciting portions of a particular broadcast. The processor may make use of this excitement data to select and record only the portions of one or more programs that particularly exciting, or that are otherwise of particular interest to the viewer.

Other embodiments provide a computer-implemented process that suitably comprises receiving and processing excitement data. Various embodiments of the process further comprise displaying one or more programs and/or one or more portions of one or more programs based upon the excitement data. The processes may further comprise displaying an entire exciting portion of digital media content associated with a program based upon excitement data. In various embodiments, the processes may further comprise displaying an excitement timeline.

Other embodiments provide a process executable by a set top box, television receiver, digital video recorder, placeshifting device or other consumer media device. The process suitably comprises: receiving a media program comprising video content at the consumer media device; receiving excitement data at the consumer media device, the excitement data indicating a then-current level of excitement of the video content; determining whether the video content is of interest to a viewer based upon the excitement data; and, if the video content is of interest to the viewer, selecting the video content for presentation to the viewer by the consumer media device, and otherwise not selecting the video content for presentation to the viewer.

Other embodiments provide set top boxes, television receivers and/or other consumer media devices for processing digital video content. Such devices suitably comprise: a storage device, such as a digital video recorder; a television receiver, network interface or similar interface to receive television or other media programs; and a processor configured to direct the device to: receive a media program comprising video content at the consumer media device; receive excitement data at the consumer media device, the excitement data indicating a then-current level of excitement of the video content; determine whether the video content is of interest to a viewer based upon the excitement data; and if the video content is of interest to the viewer, select the video content for presentation to the viewer by the consumer media device, and otherwise not selecting the video content for presentation to the viewer.

The device may be further configured to assemble a highlight reel of received programs that comprises only those portions of the received media programs during which the then-current excitement data is greater than a threshold value, and/or to implement any of the processes described above.

Still other embodiments provide other processes, systems and devices for utilizing excitement data to improve the recording and playback options available to a digital media content viewer. The examples presented in this summary may be modified, combined and/or augmented in any manner, and many additional examples are described below.

BRIEF DESCRIPTION OF THE DRAWING FIGURES

Figure 2:
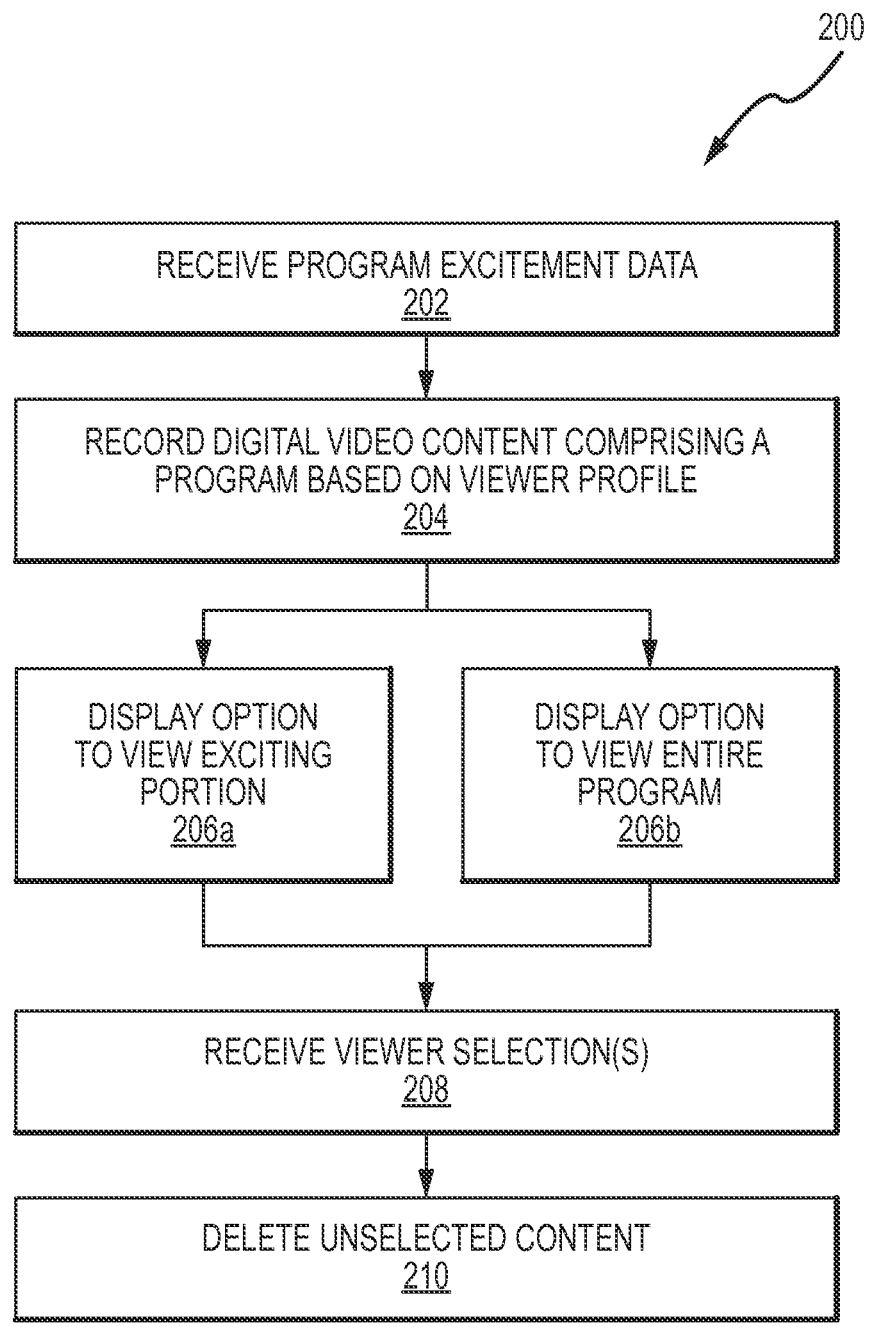
Figure 3:
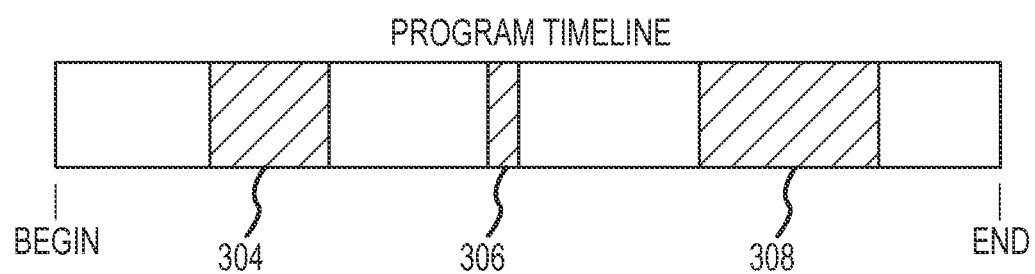

Exemplary embodiments will hereinafter be described in conjunction with the following drawing figures, wherein like numerals denote like elements, and FIG. 1 shows, in accordance with various embodiments, a system for delivering complete digital video content based upon excitement data;

FIG. 2 shows, in accordance with various embodiments, a process for delivering complete digital video content based upon excitement data; and FIG. 3 shows, in accordance with various embodiments, a program timeline that includes an visual indication associated with excitement data.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Various embodiments make use of excitement data to provide improved media viewing experiences. Excitement data can be used to identify the most exciting programming in real time as the programs are being broadcast. Further embodiments can additionally or alternately store the real time excitement data in conjunction with timestamp or similar timing data to create "highlight reels" for subsequent viewing. Other useful benefits and features could be provided in any number of alternate embodiments.

As used herein, the phrase "excitement data" may refer to any data that indicates that a program and/or a portion of a program (such as a broadcast of a sports game, or any other media programming) and/or may be exciting or otherwise of interest or potential interest to a viewer. Viewers may find programs and/or portions of programs to be exciting based upon one or more viewer preferences, based upon one or more predefined parameters, based upon subjective or objective criteria, and/or other factors as appropriate. A program and/or a portion of a program may, additionally or alternately, be exciting based upon an aggregation of viewer input. For example, a viewer may attribute, over time and as the viewer views a particular program or program genre, one or more qualities to a program event. More particularly, a viewer may, in various embodiments, attribute a tag (e.g., "funny," "sad," "suspenseful," and the like) to a particular program event. The system may analyze a plurality of event tags to predict a viewer's reaction to a particular program event.

Still other programs or portions of a program may be ranked as to their then-current level of excitement based upon objective and/or subjective criteria. In various embodiments, programs may be monitored in real time (or near real time) and their then-current level of excitement may be numerically represented in any manner. A program's then-current level of excitement may be assigned a number between 0-10, 1-10, 0-100 or 1-100, for example. Equivalent embodiments may use any other numerical, alphanumerical, color-based, symbolic or other representation, as desired. Levels of excitement may be assigned based upon subjective human monitoring, objective factors (e.g., distance to the goal line, third/fourth down, close score, near end of quarter/half/game, or other factors as desired). Thus, for example, a program and/or a portion of a program may be exciting based upon a user preference for a particular sport (e.g., football) and/or a particular event that may occur during such a program (e.g., a touchdown or other goal). Further embodiments may adjust the excitement level throughout the duration of a program to reflect more or less exciting portions of that particular program. A sporting event, for example, maybe more exciting during times that the score is close, or when a team is about to score, or during important defensive stands, and/or at any other times as appropriate. Other programs may be most exciting during dramatic tension, during battle or action scenes, during appearances by celebrities, during musical numbers, or during any other times that could be objectively or subjectively considered to be exciting.

A variety of media monitoring services exist. Many of these services monitor one or more currently-broadcast programs simultaneously to provide, in many instances, excitement data, as described above, about each of the monitored programs. Excitement data may be generated based upon one or more predefined parameters, such as, in the case of a sports program, a goal or a change in a game score, and the like. Similarly, as described herein, a media monitoring service may provide excitement data unique to a particular viewer based, for example, upon a user profile and/or bulk excitement data not associated with any particular viewer. A user profile may include, by way of example, a preference for a particular sport and/or a particular team or teams. One service that provides excitement ratings for currently-broadcast sports programs is the THUUZ service available from Thuuz Sports of Palo Alto, Calif., although other embodiments could use excitement data from any source, including data generated by a user's set top box or other home equipment.

In some embodiments, excitement data may be additionally and/or alternatively generated or altered based upon any of a variety of other external sources (outside of and/or including those provided by a media monitoring service), such as, for example, social media trending data, a media rating as provided by a media rating service and/or a plurality of media reviewer information, and/or any other externally acquired data that may be used to assess excitement data about a program. To illustrate, a program, such as a movie or film, may be associated with one or more reviewer ratings, trending data, box office data or sales, reviewer or viewer ratings and the like. These data sources may be aggregated, in various embodiments, to generate an excitement rating for the program. Here, again, excitement data may be provided to a viewer based upon a profile of the viewer and/or any of a variety of predefined parameters, or the data may simply indicate the then-current level of excitement relative to other portions of the program, or relative to other programs as desired.

In various embodiments, programs may have a pre-broadcast excitement level based upon social media data (e.g., the amount of marketing, and/or the amount of media, social media and/or other "buzz" about the program), based upon the number of viewers who have set DVR timers, based upon historical viewing patterns, and/or based upon the nature of the program. A conference or divisional championship, for example, may have a higher pre-broadcast excitement level than a game with no championship implications, or a popular team (or a local team) may have a higher excitement level than other teams. These initial pre-broadcast levels of excitement can then be adapted in real time (or near real time) throughout the course of the game to reflect periods of greater or lesser excitement, as appropriate. Again, excitement data may be received from a third party service, or generated in any appropriate manner.

Accordingly, viewers may wish to select programs for viewing based upon the level of excitement. Additionally or alternatively, viewers may wish to use the excitement data to identify the most exciting/interesting portions of a particular program, or of multiple programs.

In many instances, the viewer may be preoccupied or otherwise unable to view a program of interest as it is broadcast. Moreover, where a viewer is interested in viewing an exciting program and/or an exciting portion of a program, it is typically the case that it is too late to begin recording the exciting portion of the program (or the program from the start of the exciting portion) in response to the reception of excitement data indicating that the program has become exciting.

Thus, some embodiments could provide any number of systems or techniques for delivering digital video content using excitement data. A number of examples are described herein.

In one example, real-time indicia of a program's level of excitement can be used to know the "most exciting" portions of particular programs, such as the most interesting moments of a sporting event or other television broadcast. This information allows a set top box, video streaming device, placeshifting device, network service or other computing system to gauge the relative excitement of two or more simultaneously broadcast programs. Storing this information in conjunction with a program recorded in a DVR would allow a subsequent viewer to automatically "jump" to the most exciting portions of the recorded content. Further, the excitement data could be further averaged or otherwise processed throughout the course of the program to determine an overall excitement rating for the program; this post-broadcast overall rating could be compared to post-broadcast ratings of other programs stored on a DVR, available for streaming, or otherwise available to the viewer to help the viewer select which programs to view.

In another example, the excitement data is again associated with timestamp data or other timing information during recording or streaming of a program so that only the most interesting portions of the program are retained. That is, only portions of a broadcast that are greater than a threshold level may be stored (to conserve disk space), and/or provided as part of a live stream. In the latter case, the viewer's media streaming source would select a program from available alternatives for streaming based upon the then-current level of streaming. This could allow a viewer to watch one live stream that always contains the most exciting content that is currently available. In further embodiments, this highlight reel concept could be expanded beyond live streaming so that content stored on a DVR or the like for later viewing would retain only the most exciting portions of various programs, or so that the most exciting portions of programs stored on the DVR could be readily identified and compiled into a highlight reel, or simply made available for convenient viewing. Various systems could record all or part of a number of programs that may be of interest to a viewer (e.g., based upon a viewer's profile and/or a viewer's explicit instruction to record a program) from the beginning of each program. In response to the reception of excitement data, the system can notify the viewer that a program of interest and/or potential interest has become exciting. The viewer can, in response, elect to view the exciting portion and/or the entire program. Programs that the viewer does not select for viewing can be deleted as part of a background process, such that the viewer is unfettered by their recordation and subsequent deletion. Other embodiments could implement other features and/or operate in any other manner.

In yet another example, the excitement data associated with multiple programs could be displayed within a "heat map" or similar interface of an electronic program guide (EPG). In various implementations, cells that present individual program broadcasts can be colored, shaded or otherwise modified based upon the then-current excitement data. This data could be updated in real time throughout the broadcasts so that the viewer is able to readily identify exciting programs and to discern between multiple programs that might be simultaneously presented within the program guide. This display could be further modified based upon manually-entered and/or automatically-determined viewer preferences. A baseball fan, for example, may see baseball games highlighted while a basketball fan sees basketball games highlighted with excitement data. This would allow the programs that are of greatest interest to a user to standout from other programs, and/or for more exciting programs to be readily discerned. Again, data could be updated in real time so as the program becomes more interesting (e.g., scoring opportunities, player of interest involved in game, action sequence, musical number, etc.), the viewer is made aware of the current level of excitement shown in the live broadcast.

In still other examples, excitement data can be used to determine when a sporting event, awards show or other broadcast extends beyond its predicted time. Electronic program guides typically do not indicate when a program extends beyond its regular timeslot, so viewers who attempt to record programs based upon EPG data may find that the end of a program can be cut off. That is, if a ballgame goes into overtime, extra innings or the like, the recording device does not typically know that the program has extended beyond its predicted timeslot. Excitement data can be used to extend recording in such cases. To provide a simple example, the recording system could identify when the end of a program recording is approaching, and could monitor real-time excitement data for the program prior to that time. If the excitement data increases (or at least does not decrease) toward the end of the pre-allocated time, then the recording can be extended until such time as the excitement level decreases, thereby indicating the end of the game. Various embodiments could further verify that the excitement level remains lower for a time frame (e.g., 2-10 minutes or so) so that commercial breaks, timeouts or other factors do not produce a false positive indication for the end of the game.

Additional examples could use predicted excitement data to automatically set recordings based upon viewer preferences or the like. If a viewer is manually or automatically identified as a baseball fan (or a fan of a particular team), for example, program guide data could be checked on a daily, weekly, hourly or other periodic basis to identify programs that may be of interest to the viewer. Pre-broadcast predicted excitement data for any identified programs could be checked, and if the predicted excitement data exceeds a threshold, then the program could be automatically selected for recording on behalf of the viewer. If a viewer forgets to set a recording timer for a big game, for example, this example would automatically set a recording timer so that the viewer does not miss the game. Similar concepts could be applied to movies, reality shows, daily or weekly television series, awards shows and/or any other programming, as appropriate.

Various embodiments therefore use excitement data to identify complete programs or a portions of programs that are likely to be of interest to the viewer. Such capabilities may be implemented within any sort of computing machinery, such as set top boxes (STBs) or other television receivers that are located in viewer's homes, offices or other premises. Other embodiments may be partially or entirely implemented within media players (including media player applications executing on general-purpose computer systems), placeshifting devices, network or "cloud" servers, or any other computing hardware systems as appropriate.

Turning now to the drawing figures, FIG. 1 shows an example of a system 100 for delivering complete digital video or program content based upon excitement data. The system 100 can include a DVR 102, an excitement data database 104, one or more servers or guide servers 106, a network 108, and/or a media client 110.

A DVR 102, as described above, can comprise any system capable of recording digital video content. DVR 102 may be implemented within a STB or other television receiver, or may be any sort of standalone device or network service. DVR 102 will typically include conventional computing hardware found in consumer electronic devices and/or network services, as appropriate, including one or more processors, memory, storage, input/output interfaces and the like. To that end, a DVR 102 can include a network connection, a computer-readable, non-transitory, storage medium (e.g., a solid state memory, a spinning hard drive, and/or the like), a processor, and/or any other hardware and/or software for the recordation of digital video content. Again, system 102 may also include hardware and/or software capabilities for receiving and decoding terrestrial, satellite, cable, network streams, and/or other media content in any format, as received from any source.

An excitement data database 104 can comprise any computer-readable, non-transitory, storage medium that stores or is configured to store excitement data, as described above. Excitement data can, as described above, issue from a variety of data sources (e.g., a media monitoring service, any of a variety of social networking data such as trending data, data specific to a particular program, such as a goal or score in the case of a sports game, a media rating as provided by a media rating service and/or a plurality of media reviewer information, and/or any other externally acquired data that may be used to assess excitement data about a program). Database 104 may be a common storage that includes program content, EPG data, excitement data and/or any other data associated with stored content as desired.

In various embodiments, the excitement data from database 104 may be correlated to timestamp or similar time data so that even after a program is broadcast, the level of excitement data can still be used to identify portions of the stored program that are of greater or lesser interest. Correlation of excitement data to timestamp data may occur within excitement database 104, within server 106, or within a separate service as desired. This historical excitement data may be used to later extract the most interesting portions of programs, and/or to identify the programs that are of greatest interest to the viewer.

To that end, one or more servers 106 can be communicatively coupled to the excitement data database 106 and configured to process the excitement data in any manner. In some embodiments, the excitement data is incorporated into an electronic program guide (EPG) display 150 or the like for presentation to the viewer as part of a placeshifting or remote access application. In other embodiments, excitement data can be used to deliver programs to the user that are selected by comparing the excitement data to one or more user profiles and/or one or more predefined parameters. The server(s) 106 is typically implemented with conventional network server hardware that may comprise any of a plurality of computer readable, non-transitory storage mediums (such as disk drives, solid state memory, or other storage as desired), one or more processors, and/or any appropriate interfaces, such as interfaces to input/output devices, interfaces to network 108, and/or the like. Servers 106 may be equivalently implemented using cloud-based computing services, as desired.

Network 108 shown in FIG. 1 suitably comprises any conventional computer network, such as the internet, a local area network, a wide area network, a telephone network and/or the like. The server(s) 106 can be communicatively coupled to the network 108 via a network interface card or other interfaces, as appropriate.

One or more media clients 110 can comprise any device configured to and/or capable of receiving digital media content. Thus, for example, a media client no can comprise any computing device, such as a television, a personal computer, a smartphone, a tablet computing device, a video game player, a personal digital assistant, and/or any other similar device as desired. The media client no can be communicatively coupled to the network 108 and can receive, as described herein, notifications in response to the excitement data processed by the server(s) 106. The media client no can further receive, via the network 108 and in response to a request by a viewer of the digital media content, digital video content stored by the DVR 102.

The architecture shown in FIG. 1 could be used to implement several different embodiments that make use of excitement data obtained from database 104. In some embodiments, DVR 102 is programmed to create and store "highlight reels" of the most interesting portions of one or more programs. To that end, the DVR receives excitement data from database 104, from server 106 or from any other source as the program content of interest is received. The received programming may be recorded or not recorded by the DVR depending upon its then-current level of interest, as determined by the excitement data. DVR 102 could, for example, record only those portions of a received program in which the level of excitement exceeds a threshold level. The specific values used for this threshold may be set by the viewer, by an administrator or programmer, or by any other source as desired. A DVR could be programmed, for example, to record only the content that is of highest excitement.

This concept may be expanded in many ways. DVR 102 could work with multiple television tuners or network streams, for example, to create a "highlight reel" that automatically integrates the most exciting portions of multiple programs without express input from the user. If a user's set top box was simultaneously receiving two or more baseball games, for example, then a DVR or RSDVR associated with that STB could automatically record only the portions of those games that have the highest levels of excitement, and that are therefore deemed to be of greatest interest.

Since this "highlight reel" is created using hardware that is associated with a particular user (e.g., a home DVR or RSDVR that is associated with a particular user), a customized recoding could be created that incorporates only the most interesting portions of the specific programs of interest to the user. These programs may be manually selected by the user, or automatically selected using preference information and/or demographic information as described herein. Note that although DVR 102 in FIG. 1 is often described as a home-type device, equivalent concepts could be readily implemented within a remote storage DVR implemented on network server 106 or on another service, as desired. Excitement data could be used to make best use of a limited resource (e.g., a single tuner could be switched between two or more different programs to always capture the more exciting program). Alternately, multiple tuners or other resources could be used to simultaneously receive and decode multiple programs, with the highlight reel containing the most exciting portions of all received programs. In this latter case, if both programs simultaneously broadcast relatively exciting events, both could be received and included within the highlight reel.

In other embodiments, DVR 102 (or an equivalent RSDVR) could store the excitement data associated with program as the program is being recorded (or after the program has been recorded). If the excitement data is referenced to the recorded program via a timestamp or similar indicia, then the user may be able to automatically or manually skip to the most interesting portions during playback of the recorded program. In an example implementation, the user might select a "skip to next exciting portion" feature using a remote control or other interface. This instruction would direct the DVR to seek out the next portion of the recorded program in which the excitement data exceeds an appropriate threshold. As with the preceding embodiment, the threshold may be manually configured by the user or another human, or the threshold may be selected and set by any process (e.g., trial and error, automatic adjustment based upon user behavior or aggregate user data, or the like). By storing the excitement data for a recorded program along with timestamp data that references the excitement data to the relevant portions of the program, the "best" parts of the program can be readily and automatically accessed by the DVR, leading to an improved user experience. In an equivalent embodiment, excitement data need not be stored on the DVR 102 during live broadcasts, but rather may be retrieved from server 106 or the like as it is needed. The highlight reel created with excitement data may be stored on the DVR for subsequent viewing, and/or it may be placeshifted or otherwise streamed to remote device 110 for immediate viewing, as desired.

Still other embodiments could retrieve excitement data for multiple programs simultaneously and could formulate a user interface 150 to an EPG or other application that allows the user to conveniently select and view the programs that are of greatest interest at that moment. If an EPG display 150 is showing multiple football games, for example, the entries for the different games could be shaded to indicate their then-current level of excitement, thereby allowing the user to readily select the more exciting games for immediate viewing. If one game is nearing a critical moment (i.e., is very exciting) while another game is on a commercial break, for example, the EPG entry for the more exciting game could be more brightly or more distinctly colored within the EPG grid to draw the viewer's attention toward that entry. Equivalent embodiments could use different typefaces, different sizes of typeface, different grid sizes, flashing text or grid lines, or any other interface elements to draw the viewer's attention toward the more exciting content, as desired.

In the example shown in FIG. 1, interface 150 is shown to include a conventional EPG grid 154 in which programs are organized according to channel and broadcast time. Example interface 150 also includes a separate window 152 showing a live broadcast, and a bulletin window 156 that could include an advertisement or other notice as desired. In various embodiments, the bulletin shown in 156 could be related to the excitement data in any manner. A bulletin could point out the most exciting program being currently broadcast, for example, or the most exciting program that is currently visible in the EPG grid 154. Other embodiments could provide specific messages that are related to the underlying content (e.g., "Broncos are driving!" when the Broncos are within the red zone).

In the example interface 150 of FIG. 1, the various live broadcasts are shaded different colors to reflect their relative then-current levels of excitement based upon received excitement data. If the excitement data indicates that channel 3 is most exciting, then this channel may be highlighted, shaded or otherwise brought to the viewer's attention as desired. Grid entries showing other programs may be shaded, colored or otherwise highlighted to indicate their then-current excitement levels as well. In various embodiments the highlighting in grid 154 is updated in real time (accounting for delays inherent in processing, transmission and the like) so that the most interesting programs stand out from the less interesting programs even as different events occur during the program. Shading or other highlights may be based solely upon received or generated excitement data in some implementations; other implementations may further consider user preferences, as appropriate so that the grid adapts to viewer preferences (e.g., favorite player coming up to bat) and/or excitement data as the live broadcast progresses. Such user preferences may be manually configured (e.g., via a user interface where the viewer manually selects preferences) or automatically based upon observed viewing behavior, demographic information and/or other factors as desired.

The particular interface 150 shown in FIG. 1 could be modified in many different ways. Windows 152 and/or 156 could be eliminated, for example, and/or grid 154 could be organized and presented in any other manner. Still other embodiments could present grid data or other excitement data for one or more programs as an overlay, in a scrolling bar at the edge of the screen, as a "bug" or other indicator superimposed on the viewer's image, and/or in any other manner. As a viewer watches one program, for example, an overlay or bug could be generated whenever excitement levels for a different program exceed a suitable threshold as to deserve the viewer's attention. Many other equivalent embodiments could be formulated in any number of other applications and settings.

The example interface 150 shown in FIG. 1 could be generated at media client 110 based upon data received from server 106. This could be used, for example, in a placeshifting or other media streaming application. Other embodiments could additionally or alternately generate interface 150 using DVR 102, or any sort of television receiver/STB for presentation on a locally-connected television or other device, as desired. Still other embodiments may provide interfaces 150 for other types of media streaming, media viewing, media storage or other applications as desired.

Still other embodiments could use the excitement data to identify commercials in a live or pre-recorded broadcast, and to take desired action in response. In some implementations, commercials could be given their own excitement rating, allowing commercial breaks to be readily identified. This could allow a highlight reel to automatically skip commercials, if desired, or a DVR to automatically skip commercials during playback. In other embodiments, the user could simply identify that a particular program was currently on a commercial break from data presented in an EPG or other interface, as desired. Other embodiments could equivalently provide other benefits and features, as desired.

An example process to improve media viewing through the use of excitement data is presented in FIG. 2. With attention now to FIG. 2, a process 200 for delivering or otherwise rendering digital video content based upon excitement data is described. Process 200 may be executed by any sort of computing machinery having a processor and memory. Process 200 may be executed, for example, by a set top box, television receiver, DVR 102, media client 110, server 106 and/or other computing device, as desired. Other embodiments could divide the various processing functions between different client and server systems and/or make use of cloud based or other processing hardware, as desired.

In various embodiments, a database 104 can receive, e.g., from any of a variety of sources, as described above, excitement data associated with a particular program or programs (function 202). A server or plurality of servers (e.g., a server farm and/or a guide server/server farm) can receive and/or request and receive in response the excitement data from the database 104. For instance, the server(s) 106 can communicate with an application programming interface ("API") stored in or communicatively coupled to the excitement data database. More particularly, in various embodiments, the server(s) 106 can periodically query the API and receive, in response, excitement data associated with a variety of programs. However, in various embodiments, the server(s) may not query the excitement data database 106. Rather, the server(s) can receive, e.g., on a periodic basis and/or in response to an exciting event, as determined, for example, by the media monitoring service, the excitement data.

As described above, a DVR, set top box and/or other consumer electronics system 102 can receive, from a content provider, a variety of digital video content associated with a variety of programs. Based upon the viewer profile (e.g., as stored by the server(s) 106 and communicated over the network 108 to the system 102), the DVR 102 can record any digital video content that the server(s) 106 associates with the viewer profile and/or any digital video content that the viewer may explicitly associate with the viewer's profile and/or request (function 204). The system 102 can record the digital video content associated with each program of interest from the beginning of the program. System 102 may also store excitement data with timing information that ties the levels of excitement to particular portions of the received program to facilitate later processing or manipulation of the stored content based upon the excitement data for that portion of the content. Thus, the system 102 can have a complete record of each program of interest or potential interest to a viewer.

In some implementations, as excitement data is received with respect to one or more programs (function 202), the server(s) 106 can generate a message, a notification, an alert, and the like indicating that particular digital video content associated with one or more programs of interest (or potential interest) to the viewer have become exciting. This message can be communicated to the viewer's media client 110 by the server(s) 106 via the network 108. In other embodiments, live notifications may not be provided, but system 102 may nevertheless process the received programming based upon the excitement data as described herein.

In some examples, the media client no can display an option to view the exciting portion of the digital media content of the program and/or to delay for later viewing the exciting portion (function 206a). Similarly, in various embodiments, the media client no can display an option to view the digital media content of the entire program and/or to delay for later viewing the digital media content of the entire program (function 206b). User inputs are received (function 208), and processed as appropriate. Processing may include, for example, recording the exciting content, providing a media stream of the exciting content, or taking other actions as directed by the viewer. Content that is not selected by the viewer could be deleted (function 210), eliminated from a highlight reel, or otherwise processed as appropriate.

To that end, a DVR, STB or other consumer electronics system/device that is associated with a television viewer or other customer can perform an automated process 200 that uses excitement data to improve the viewer experience. The excitement data can be used to automatically create a recording timer for an upcoming program; to select one or more programs for presentation, streaming and/or recording; to identify the most exciting portions of one or more programs for compilation into a highlight reel or highlight viewing stream; and/or for any other purpose. As noted above, process 200 could additionally consider viewer preference data in selecting the most exciting content. If a viewer is known to prefer baseball over football, for example, then an excitement "boost" in the form of a bonus could be added to excitement scores associated with baseball games. An excitement "penalty" could be additionally or alternately subtracted from less preferred content, as desired. These modified excitement scores could therefore be used to select programming for viewing, recording, streaming and/or other purposes.

Moreover, as shown with general regard to FIG. 3, a media client 110 can display a program timeline from beginning to end (e.g., as a bar representing a time shift buffer or the like), and highlight exciting portions of the program. For example, as shown, a program may comprise a first exciting portion 304 at time span 1 (t1), a second exciting portion 306 at time span 2 (t2), and third exciting portion 308 at time span three (t3), and the like.

Thus, in general terms, a program can be displayed along a timeline and one or more visual cues or indicators may be displayed to alert a viewer to exciting portions of the program. These indicators may be displayed in any style that is suitable. This would allow the user to readily identify the portions of the pre-recorded program that are of greatest interest. Such an interface may be generated wholly or in part by DVR 102, by media client 110, by server 102, or by another service as desired. This allows the viewer to navigate directly to the most exciting portions of the program represented by the timeline. In some implementations, the viewer may be able to select the highlighted portions (e.g., portions 304, 306, 308) to navigate directly to those portions for immediate viewing of the more exciting portions of the program. Other embodiments could simply allow the viewer to navigate through the timeline using fast forward/rewind type keys, similar to a conventional time shift buffer, but with more exciting portions highlighted for easy identification by the viewer.

As noted above, visual cues can be displayed in an EPG or similar display in the style of a "heat map." That is, for example, an exciting portion of a program can include an excitement rating or value, such that a viewer is provided additional information about the excitement level or value of the program.

This excitement rating or value (based upon data from database 104) can be represented according to a color, a type face, a typeface size, flashing or pulsing type, by background shading or hatching, and/or by any other interface mechanism that draws the viewer's attention toward the most exciting programs. In various embodiments, an exciting portion can be associated with any of a variety of excitement levels, and these can be displayed in any suitable manner, such as in association with a variety of colors (e.g., green for not very exciting, yellow for somewhat exciting, red for exciting, and the like). An excitement level or value can be based upon received excitement data, as described herein, and/or a viewer profile. Thus, a first viewer may receive a first excitement timeline and/or notification about a program, while a second viewer may receive a different excitement timeline and/or notification about the program, each depending upon the individual profile of each viewer. Thus, a viewer may receive targeted or tailored program content and/or excitement notifications based upon the profile of the viewer. Stated another way, the content of greatest interest to the viewer can be highlighted based upon a comparison of user preference data and excitement data received from server 106.

In an example placeshifting implementation, for example, a user operates a media client application on device no that interacts with a server 106 on network 108. The server 106 suitably delivers EPG data and/or interfaces that allow imagery to be generated on device no as described herein. In some embodiments, the imagery could contain "heat map" or other data about available programming to help the user select programs of greatest interest. Again, an example interface 150 is shown in FIG. 1, although other embodiments could generate different interfaces as desired. "Heat map" type interfaces could be generated for presentation on media client 110 (e.g., as part of a placeshifting, IPTV, VOD or other media application). Equivalent embodiments could be implemented with television receivers, STBs, DVRs or other home devices to generate interfaces such as interface 150 on a locally-connected television or the like.

Further embodiments could alternately or additionally present excitement data in a recorded program as part of a time shift buffer indicator, as described above. In such embodiments, a viewer can tap or select (e.g., in the instance that the media client 110 of the viewer includes a touch screen display) a portion of a program, such as portions 304, 306, and/or 308, each of which can be associated with any of a variety of excitement levels. In response to such a selection, the media client 110 can skip, in the media stream, to the selected program portion. Thus, a viewer can view any of a variety of demarcated exciting portions 304, 306, 310, and the like.

Further, in various embodiments, the viewer can select an option to view the exciting portion of the digital media content of the program and/or to delay for later viewing the exciting portion and/or to view the entire digital media content of the program and/or to delay for later viewing the entire digital media content of the program (function 208). The DVR 102 can, in response to the viewer's selections, store the selected digital media content for viewing and/or stream the selected content to the viewer's media client 110. The DVR 102 can, in addition, delete any unselected digital media content in the background (e.g., without viewer instruction), so that the viewer is unfettered by the necessity of deleting unwanted content (function 210).

In some embodiments, the system 100 can capture an exciting portion of a program from the beginning of the exciting portion. In contrast, if the system 100 were to await notification of excitement data to begin recordation of the digital media content associated with a program, the system would be hard pressed or simply unable to capture the entire exciting portion, because recordation would not begin until a delay between reception of the notification and the beginning of recordation would occur.

The terms "exemplary" and "example" are used herein to represent one example, instance or illustration that may have any number of alternates. Any implementation described herein as exemplary is not necessarily to be construed as preferred or advantageous over other implementations.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A process executable by a consumer media device, the process comprising:
   receiving a media program comprising video content at the consumer media device, the media program having a predicted end time according to a predicted timeslot described in an electronic program guide previously stored by the consumer media device;
   recording the received media program by the consumer media device;
   receiving excitement data at the consumer media device during the receiving of the media program, the excitement data indicating a then-current level of excitement of the media program;
   determining, by the consumer media device, if the media program has continued past the predicted timeslot based upon the excitement data by comparing the then-current excitement data to a predetermined threshold after the predicted timeslot has ended; and
   if the consumer media device determines that the then-current excitement data exceeds the predetermined threshold after the predicted timeslot has ended, the consumer media device continuing to record the media program beyond the predicted end time.

2. The process of claim 1, further comprising:
   determining, by the consumer media device, whether the video content is of interest to a viewer based upon the excitement data;
   if the video content is of interest to the viewer, the consumer video device selecting the video content for presentation to the viewer, and otherwise not selecting the video content for presentation to the viewer; and
   wherein the consumer video device receives a selection from the viewer to provide the entire media program or to provide only a portion of the media program, wherein the selected portion of the media program comprises only those portions of the media program during which the then-current excitement data is greater than a threshold value.

3. The process of claim 2, further comprising deleting the complete program in response to the viewer not selecting the option to view the complete exciting portion of the program.

4. The process of claim 3 in which the selecting comprises assembling a highlight reel that comprises only those portions of the media program during which the then-current excitement data is greater than a threshold value.

5. The process of claim 4 further comprising storing the highlight reel in a digital video recorder for subsequent viewing by the viewer.

6. The process of claim 4 further comprising providing a media stream of the highlight reel to a media player for viewing of the highlight reel on the media player by the viewer.

7. The process of claim 2 wherein the selecting further considers user preference data in determining whether the media program is of interest to the viewer.

8. The process of claim 2 wherein the selecting comprises comparing the then-current excitement data for a plurality of programs to thereby identify the most exciting one of the plurality of programs at a particular point in time.

9. The process of claim 1 further comprising generating an electronic program guide image by the consumer media device, the electronic program guide image having a plurality of cells each associated with one of a plurality of media programs, wherein at least some of the cells are presented in a manner that indicates the then-current excitement data for the media programs that are associated with the cells.

10. The process of claim 9 further comprising updating the cells of the electronic program guide image in real time as the excitement data changes for one or more of the plurality of media programs.

11. The process of claim 9 further comprising generating, by the consumer media device, a timeline that represents the excitement data of the media program throughout the duration of the media program, wherein the timeline is displayed in a manner such that viewer is able to identify portions of the media program on the timeline that are more exciting than other portions of the media program.

12. A consumer media device for processing digital video content, the device comprising:
a digital video recorder;
an interface to receive media programs; and
a processor configured to direct the interface to:
receive a media program comprising video content at the consumer media device;
direct the recording of the media program to the digital video recorder as the media program is received;
receive excitement data at the consumer media device as the media program is received, the excitement data indicating a then-current level of excitement of the video content;
determine if the media program has continued past the predicted timeslot based upon the excitement data by comparing the then-current excitement data to a predetermined threshold after the predicted timeslot has ended; and
if the then-current excitement data exceeds the predetermined threshold after the predicted timeslot has ended, continue to record the media program beyond the predicted end time.

13. The device of claim 12 wherein the processor is further configured to:
determine whether the video content is of interest to a viewer based upon the excitement data;
if the video content is of interest to the viewer, select the video content for presentation to the viewer by the consumer media device, and otherwise not selecting the video content for presentation to the viewer; and
assemble a highlight reel of received programs that comprises only those portions of the received media programs during which the then-current excitement data is greater than a threshold value.

14. The device of claim 13 wherein the processor is further configured to store the highlight reel in a digital video recorder for subsequent viewing by the viewer.

15. The device of claim 13 wherein the processor is further configured to provide a media stream of the highlight reel to a remotely-located media player for viewing of the highlight reel on the media player by the viewer.

16. The device of claim 13 wherein the processor is further configured to create the highlight real by analyzing the excitement data for a plurality of programs to thereby identify the most exciting parts of each the plurality of programs and combining the most exciting parts of each of the plurality of programs into a common highlight reel.

17. The device of claim 12 wherein the processor is further configured to compare the then-current excitement data for a plurality of programs to thereby identify the most exciting one of the plurality of programs at a particular point in time.

* * * * *